UNITED STATES PATENT OFFICE.

FRANK HINMAN PIERPONT, OF HORLEY, ENGLAND, ASSIGNOR TO LANSTON MONOTYPE MACHINE COMPANY, OF PHILADELPHIA, PENNSYLVANIA, A CORPORATION OF VIRGINIA.

TYPE CASTING AND COMPOSING MACHINE.

1,149,286.  Specification of Letters Patent.  Patented Aug. 10, 1915.

Application filed November 13, 1912. Serial No. 731,190.

*To all whom it may concern:*

Be it known that I, FRANK HINMAN PIERPONT, a citizen of the United States, residing at Salfords, Horley, in the county of Surrey, England, have invented a certain new and useful Improvement in Type Casting and Composing Machines; and I do hereby declare the following to be a full, clear, and exact description of the same, reference being had to the accompanying drawings, forming a part of this specification, and to the figures and letters of reference marked thereon.

This invention relates to automatic type casting and composing mechanism or machines for the production and composition or assembling, in lines in special holders, of what are known as short body types or types possessing all the characteristics of ordinary printing types save as to length of body and the means for effecting their retention in special holders or forms which latter are used in, or applied to, envelop or wrapper addressing, ticket or form printing machines and apparatus or machines for similar purposes.

The holders above referred to are in general, oblong in form and provided with grooves or channels, one for each line of matter such as a name and address, the sides of the grooves or channels being adapted to enter recesses or the like in the sides of the type bodies to retain them in position.

The chief object of the present invention is to provide for the casting and composing in lines of short body types in the same manner and with the same facility with which ordinary commercial type has hitherto been dealt with, and further, to assemble the types in the special holders with which they are associated. Hitherto, where it has been possible to produce and compose types of this class, the lines have either been delivered unseparated, necessitating their being broken up and arranged by hand and separately assembled in the holders, or the lines have been assembled in an ordinary galley necessitating their being transferred by hand to the holders.

According to the present invention, a mold is specially contrived and adapted for producing the types which, after casting, are ejected from the mold and delivered and assembled in lines in holders which are automatically positioned or presented to receive successively cast types, and receive these in proper lines required to fill or complete the particular holder.

The mold is constructed to produce type bodies with grooves, projecting parts or other appropriately shaped parts to be engaged by correspondingly shaped members or parts on the holders, by which the types are held securely in position. Pushers or their equivalent deliver the types from the mold to a channel and thence to the holders. A movable or rotary table or conveyer is mounted at one end of the type delivery channel and is provided with devices whereby the aforesaid holders may readily be inserted on and removed from the table without interfering with or stopping the operation of the machine. This table is automatically controlled to present the holders successively to the line delivery channel and to automatically present each line channel in the holder in succession to receive its apportioned types.

The mechanism controlling the presentation of a holder and the various grooves or channels therein to receive the types, is automatically controlled by a signal in the pattern or governing element of the casting mechanism or machine.

Referring to the accompanying drawings Fig. 1ª is a top plan view, on an enlarged scale, of the right half of the machine, Fig. 1.

Like letters of reference in the several figures indicate like parts.

The present improvements though not exclusively are specially applicable to the automatic type casting and composing machine of Patent No. 625,998, dated Sept. 30, 1899 (British Patent No. 8633/99) with the improvements of Patent 674,374, dated May 21, 1901 (British Patent No. 8980/01) applied thereto and will be hereinafter described as applied to machines constructed and operating in accordance with those inventions. It will suffice for present purposes to identify some of the principal parts or characteristic features of the patented machine, reference being had to said patent for a more full and detailed disclosure.

The die case 1 containing a series of matrices representing the various type to be produced is connected to a duplex centering or positioning mechanism under the control of two signal responsive primary gages or stop pins 2, whereby, through a two-way movement, the die case is shifted to present any of its matrices opposite the mold and in position to be clamped thereto preliminary to the injection of the molten metal. The primary gages are controlled through signal perforations in a record strip passing through the paper feed mechanism 8. The final positioning and clamping of the selected matrix upon the mold is effected by the centering pin 10 acted upon by the centering pin lever 9.

14 is the galley trip and pump-lock actuating rod which is reciprocated when either of two rods 12 is moved by its piston in response to a signal perforation into engagement with the elevated portion of a stepped and slotted member 11 on the centering pin lever 9.

Each type as discharged from the mold is received in a type carrier 18 and by the latter translated opposite the channel G into which it is discharged by the pusher 19. 16 is the operating rod through which the mold blade is actuated to dimension the mold cavity and eject the type therefrom.

The die case positioning or centering mechanism, the record strip operating mechanism and the pump or metal injecting mechanism (not shown) are, as before stated, constructed and operated in accordance with the prior patent referred to, save in this, that the normal, and, if desired, the justification wedges for effecting adjustments of the mold cavity and the galley mechanism are removed or omitted, thereby eliminating or suppressing for the time being the mold adjusting functions of rods 12 and the galley tripping action of rod 14, while at the same time preserving its pump lock-out action.

Figures 7, 8, 9, 10, 12, 18, 19:
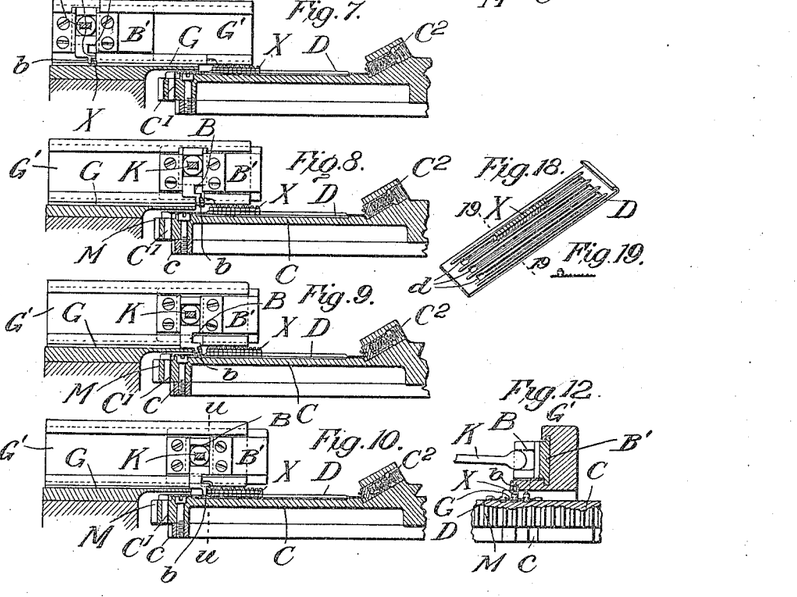
Fig. 7 is a similar view at the time of the first engagement of the type.
Fig. 8 is a similar view at the end of the first advance of the type transferrer.
Fig. 9 is a similar view showing the movement of inserting the type in the holder.
Fig. 10 is a similar view showing the type transferrer at the end of its second advance.
Fig. 12 is a similar view with the pusher in its lower or engaging position.
Fig. 18 is a perspective view of a holder into which the type are delivered.
Fig. 19 is a section on the line 19—19, of Fig. 18.
Figure 11:
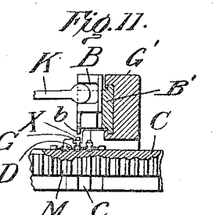
Fig. 11 is a section on the line z—z with a portion of the carrier in elevation.
Figure 13:
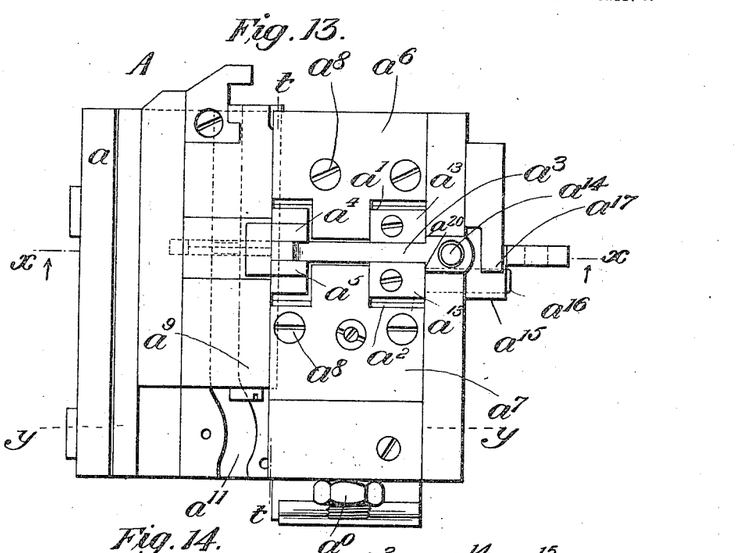
Fig. 13 is a plan of the mold.
Figure 14:
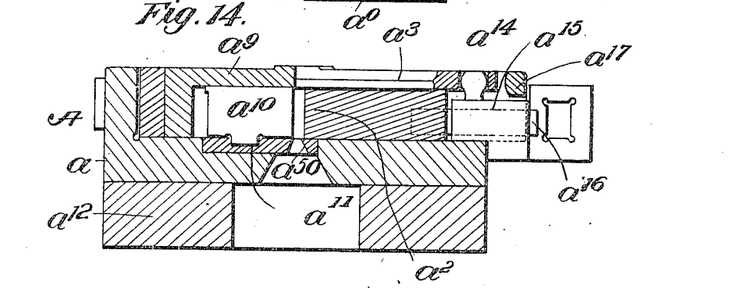
Fig. 14 is a sectional elevation on the line x—x, of Fig. 13.
Figure 15:
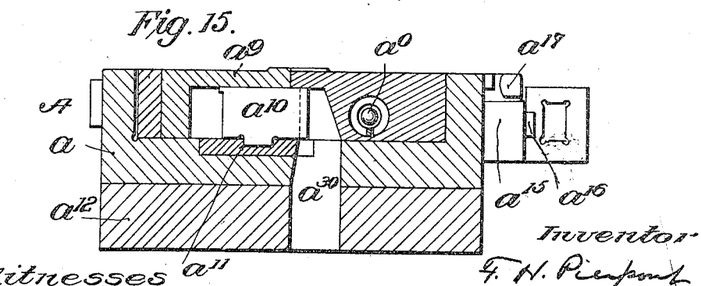
Fig. 15 is another sectional elevation of the mold on the line y—y of Fig. 13, the cross block having been shifted to the sprue ejecting position.
Figure 16:
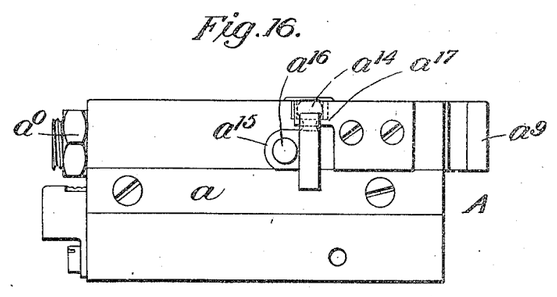
Fig. 16 is a rear elevation of the mold.
Figure 17:
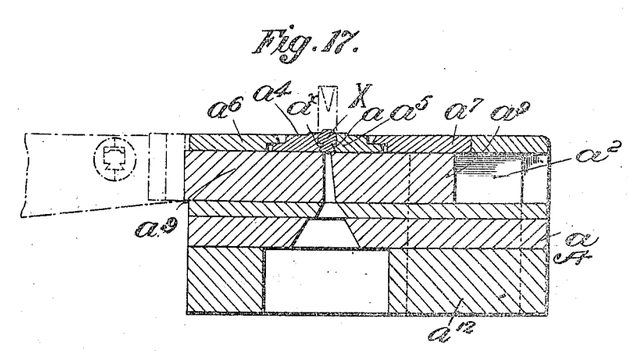
Fig. 17 is a sectional elevation on the line t—t, Fig. 13, showing a type body in the mold.

The mold of the prior machine is replaced by one specially designed for the production of short body type X the head or face whereof is the same or similar to standard type but the body portion is very much shortened and shaped to fit a specially constructed holder such as that illustrated in Fig. 18.

According to the present invention the mold comprises a base section $a$ to which is secured a squaring block $a^2$ and a cam plate $a^{11}$, the latter provided with a perforated nozzle seat $a^{50}$ through which the molten metal is injected into the mold. Block $a^2$ is secured to the end block of section $a$ by a bolt $a^0$. Mounted upon the squaring block as by screws $a^8$ so as to slightly overhang one edge thereof are two side blocks $a^4$, $a^5$, the proximate faces whereof are provided with longitudinal ribs or projections $a^x$ conforming to the undercut sides of the produced type and said side blocks are retained in position upon the squaring block by overlapping plates $a^6$, $a^7$ bolted to said block.

Supported to reciprocate longitudinally upon the upper surface of squaring block $a^2$ in the interval between the side blocks is the mold blade $a^3$ the sides or edges whereof are undercut or grooved to receive and fit the ribs or projections of said side blocks. The mold blade is supported against displacement by two plates $a^{13}$ properly shaped to enter the grooves in the mold blade and to form top bearings or retainers therefor, said plates being adjustably secured to the squaring plate and forming stops against which shoulders $a^{20}$ on the mold blade contact, to limit the forward or discharging movement of said mold blade.

The rear end of the mold blade is provided with a socket or bearing for the reception of a spherical stud $a^{14}$ carried by a block $a^{15}$, the latter riding on a stud or guide $a^{16}$ and provided with an opening for the reception of the usual cross pin carried by the mold blade operating rod 16. Reciprocating upon base $a$ and suitably guided thereon is the cross block $a^9$, engaging the edges of side blocks $a^4$, $a^5$ and provided with an offset portion extending beneath said side blocks and engaging the edge of the squaring block. The side block contains the usual jet opening and jet ejector $a^{10}$, the latter engaging cam plate $a^{11}$.

As the mold is of less than standard height it is mounted upon a filling block $a^{12}$ of the required dimensions, and this block together with the base and squaring block are recessed to form a passage $a^{30}$ for the escape of the jet. As the bodies of all type cast from the die case are designed to be of the same dimensions, the usual mold adjusting appliances are dispensed with and the mold is furnished with a fixed stop in the form of a block $a^{17}$ detachably secured to the base and projecting in rear of the mold blade, so that when operating rod 16 is moved to retract the mold blade the latter will abut against and be arrested by said block $a^{17}$.

The movements imparted to the cross block and type carrier are the same as in the prior patented machine, that is to say, the mold being closed and the cross-block stationary, after the cast is made the cross-block and carrier are advanced to cut off the sprue from the base or foot of the type and present the sprue opening opposite passage $a^{30}$ with the carrier opposite the mold cavity. During this movement ejector $a^{10}$ advances to discharge the jet, and, the cross block coming to rest, the mold blade is advanced to discharge the type into the carrier. The cross-block and carrier are now retracted to bring the latter into register with channel G whereupon pusher 19 advances to discharge the type into said channel, after which the cross-block is returned to initial position ready for the next cast. According to the present invention the type thus deposited into channel G are transferred to and assembled in lines in one of a series of holders D specially adapted to receive the dovetail or other shaped body portion, said holders being detachably mounted upon a carrier C which is actuated to automatically present the successive line receptacles in each carrier in position to receive the type appropriate thereto, and to in like manner present successive holders, these movements being controlled by signals in the record strip as will presently appear.

The holders D herein shown are of known construction and are such as are used in connection with envelop addressing machines. Each comprises a plate of metal containing three parallel slots or ways, the edges whereof are bent or turned to form retainers or guides for the type, each of said slots terminating in or provided with an opening $d$ through which the body of the type is entered to engage the retainers. The holders D are detachably supported upon a carrier or table C in radial relation to its axis of rotation, as by having one end passed under the head of a pin $C^7$, the opposite end being engaged by a spring clip $C^2$, so that while the machine is running, empty holders can be placed upon and filled ones removed from the carrier. A portion of the carrier on which the holders are mounted extends beneath the delivery end of channel G, the bottom of the latter terminating at a point opposite the openings $d$ and the sides continued beyond said opening to serve as guides for the type as it is transferred from the channel G, to the holder D. Such transfer is effected by the mechanism about to be described whereby each type, after being deposited in channel G by pusher 19, is advanced to a point opposite the opening $d$ in the line of the holder at the time in position, then inserted in said opening and subsequently advanced into engagement with retainers, said operation being repeated until the matter for each line is composed and set up, whereupon the carrier in response to a signal is automatically advanced to present the next type receiving recess whether it be in the same or the next adjacent holder.

Figure 1:
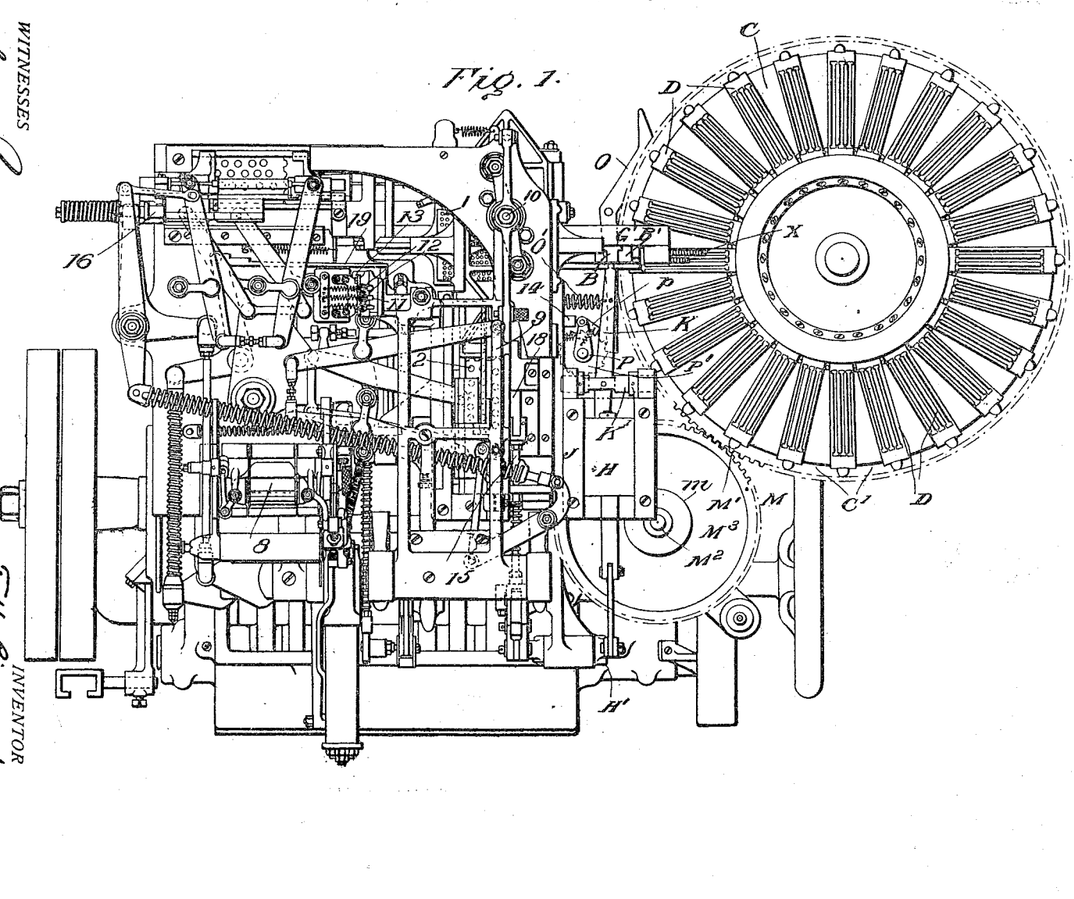
Figure 1 is a plan view of mechanism according to the present invention.
Figure 1A:
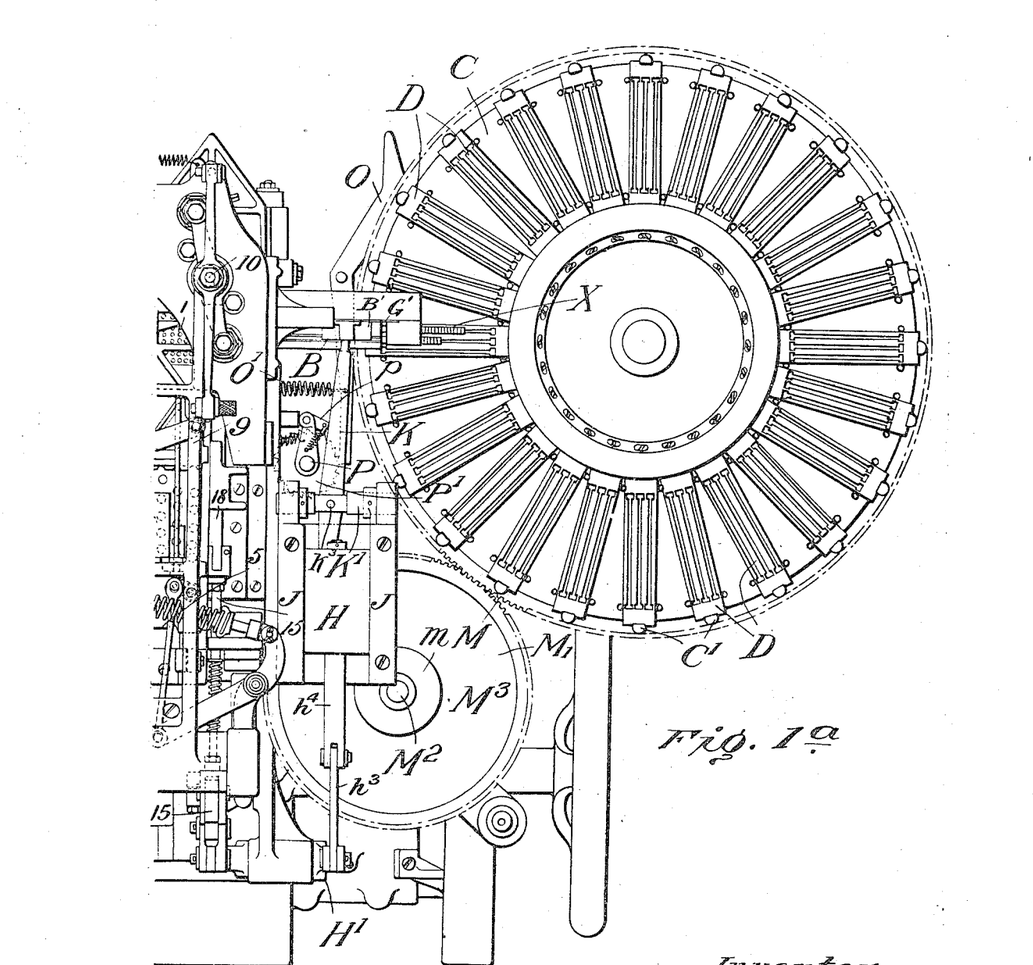
Figure 2:
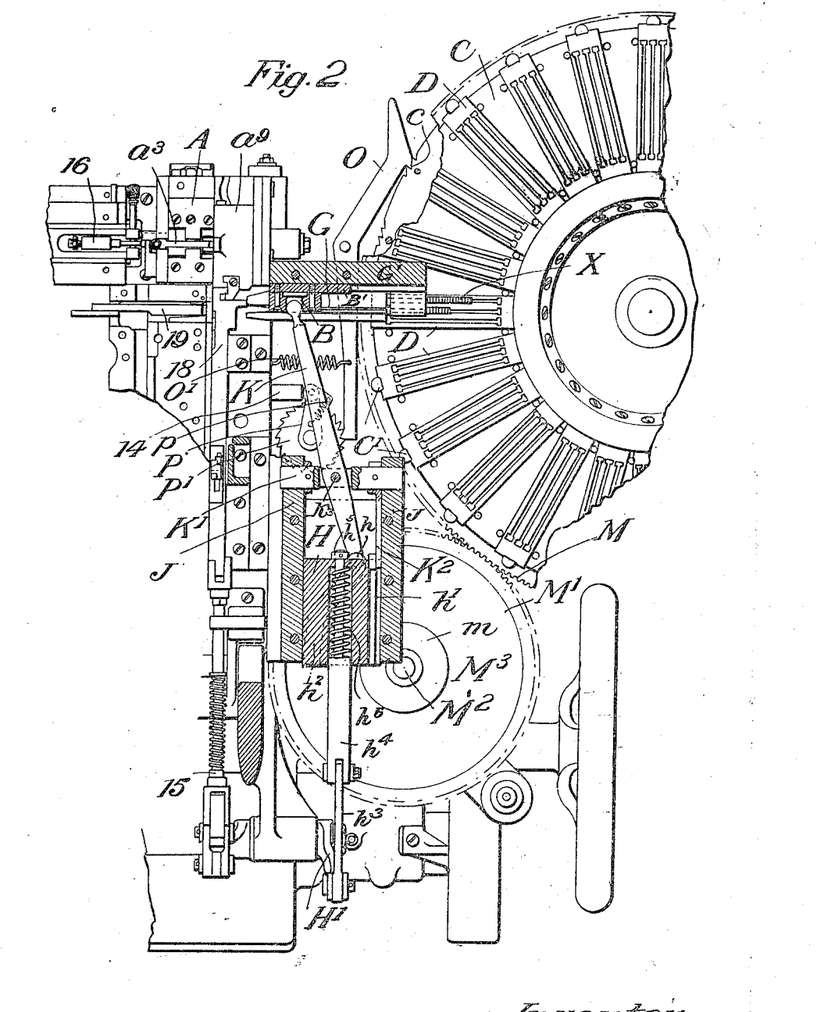
Figs. 2 and 3 are sectional plans showing the operative parts in different positions assumed by them in the cycle of operations.
Figure 3:
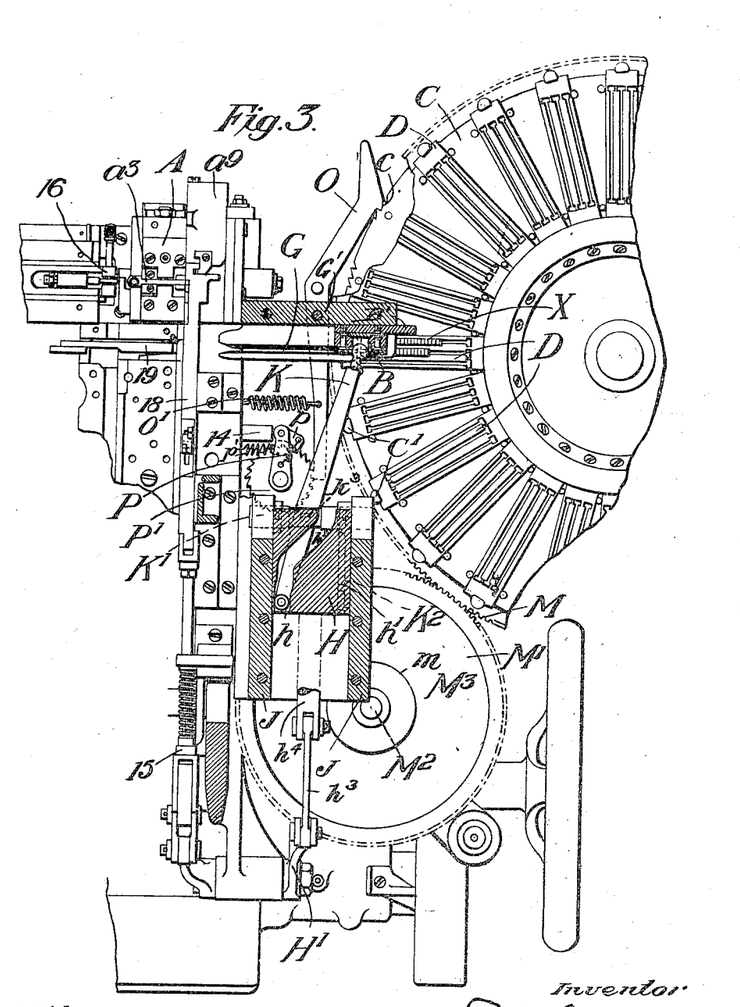
Figure 4:
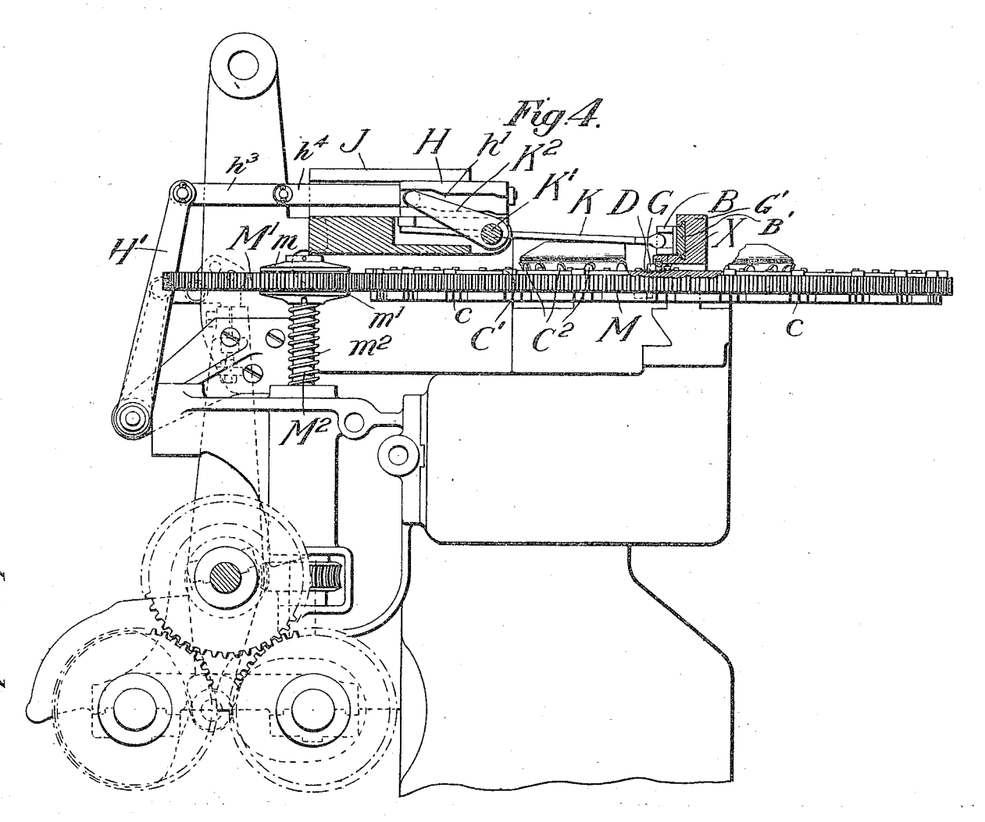
Fig. 4 is a front elevation partly in section of the actuating devices for the type feeding and carrier presenting mechanisms.
Figure 5:
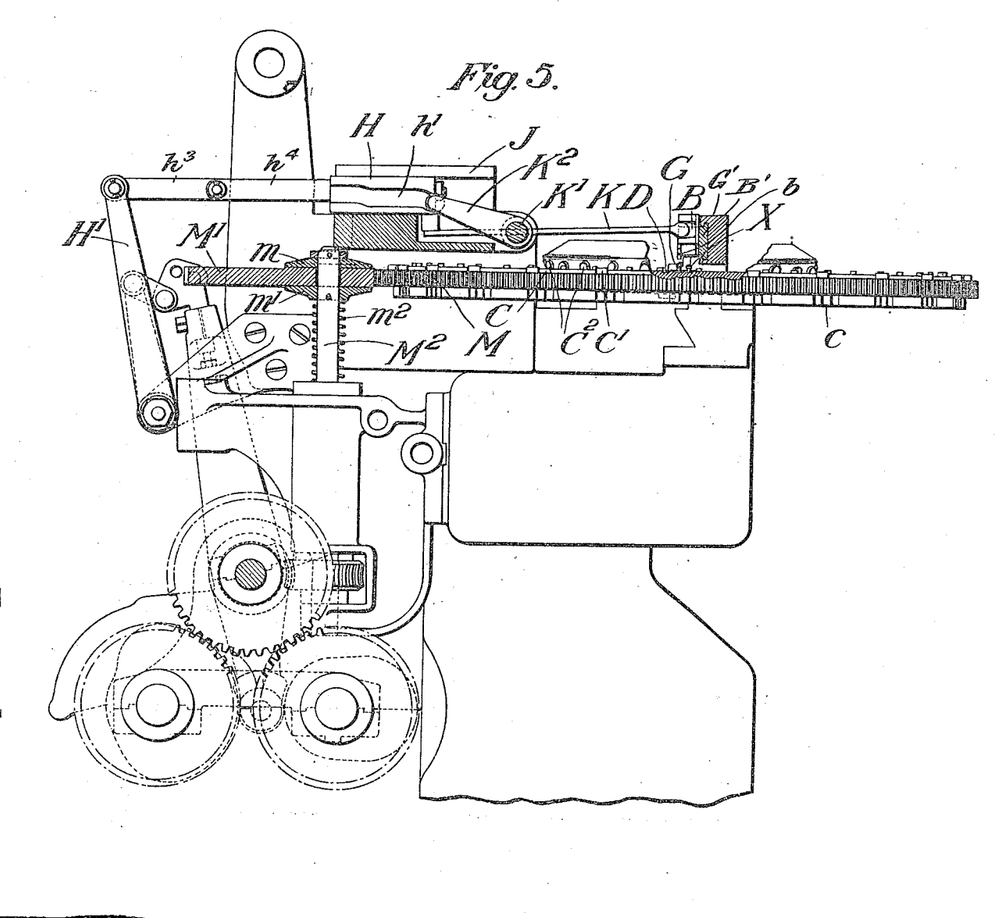
Fig. 5 is a similar view, the parts being in a different relation.
Figure 6:
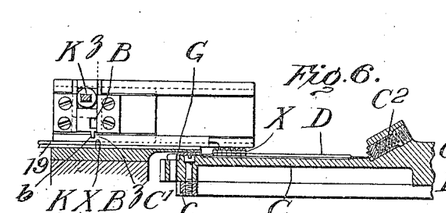
Fig. 6 is a sectional elevation of the type delivering mechanism in position to act upon a type in the line channel.

Supported to reciprocate in guides G' radially of and above the carrier and in parallel with channel G is a head B' provided with transverse ways in which is mounted a slide B equipped with a shouldered projection or translating member $b$ above and in line with channel G. As thus arranged said translating member is capable of motion in two directions, vertically and longitudinally of channel G, and is subject to the action of a lever K pivotally supported in a frame J upon a gimbal joint, in this instance formed by a horizontal pin K' turning in bearings in frame J and slotted to receive lever K the latter turning on a pin $K^3$ disposed at an angle to the axis of pin K'. The inner end of lever K is provided with a spherical head engaging a socket or bearing in slide B and the opposite end of said lever carries a pin or projection $h$ riding in a cam groove or slot $h^2$ formed in a head H. To pin K' is secured an arm $K^2$ carrying a roller, the latter riding in a cam groove $h'$ also formed in head H in a plane perpendicular to cam groove $h^2$. Head H is supported to reciprocate in guides in frame J, and for convenience is connected for operation with the actuating device 15 of the cross block and type carrier, as through arm H', link $h^3$ and rod $h^4$, the latter positively engaging head H in one direction through head $h^5$ and elastically through spring $h^6$, in the opposite direction, the return or idle movements of the translating device being effected through the positive, and the performing or active motions through the yielding connections, so that in the event of interruption during the feeding movement the spring will yield to prevent breakage. Cams $h^2$ and $h'$ are so shaped and related to each other and to the actuating mechanism for the cross block and type carrier as that when the mold is in position for a cast to be made (at which time the type carrier will be in register with channel G, and head H fully retracted, as in Fig. 2) translating member $b$ will occupy a position above and in rear of the delivery point of pusher 19 as shown in Fig.
6. The delivery of a type into channel G by pusher 19 is followed by a movement of the cross block and type carrier to cut off the sprue and present said carrier to the mold and is accompanied by a forward movement of head H resulting first in a lowering of slide B to bring translating member $b$ in rear of the type with its shoulder overlying the latter (Fig. 7); second in a horizontal movement of slide B and head B' to advance the type beyond the floor of channel G opposite the opening $d$ of the carrier, the type fitting snugly in said channel and being frictionally supported thereby; third, a vertical movement of slide B to move the type down from the channel into the holder (Fig. 9); fourth, a second or further horizontal movement of slide B and head B' to move the type together with all preceding type thus deposited and forming part of the same line into the grooved way in the holder. The further or return movement of the cross block and type carrier to the casting position likewise returns the translating member to initial position ready to act upon the next type delivered to channel G.

The feeding movements of the carrier for presenting successive holders and successive lines of the same holder in register with delivery channel G may be effected by various mechanisms, and a preferred form of embodiment is shown herein, whereby either one of the justification signals common to the prior patented machine and herein rendered otherwise useless because of the absence of the normal wedge, can be utilized for controlling the line feed movement.

Carrier C is provided with gear teeth M meshing with the teeth of a pinion M', the latter loose on shaft $M^2$, and connected therewith through a friction clutch such as that formed by friction plates or disks $m, m'$ located on opposite sides of pinion M' and held thereto with a clamping pressure by a spring $m^2$. One or both of said plates $m, m'$ is or are connected to rotate with shaft $M^2$ and the latter is connected with the driving mechanism of the casting machine, to rotate continuously while the machine is in motion, hence unless otherwise restrained the carrier would continue to revolve.

The restraining or locking device shown comprises a toothed locking lever O arranged to engage teeth $c$ on the periphery of carrier C. The teeth $c$ are arranged in groups corresponding to the locations of the holders and of the type receiving channels in said holders, adjacent groups of teeth being separated by blank spaces. The movement imparted to the carrier is relatively slow and is entirely arrested so long as the locking lever O remains in engagement with any one of the teeth $c$, but immediately said locking lever is withdrawn the carrier resumes its motion under the pressure of the driving devices and so continues until again arrested by the reëngagement of said locking lever, which latter is advanced to its engaging position by a spring $o'$. The momentary withdrawal of the locking lever to permit the escape of the engaged tooth may be effected by a toothed wheel P' engaging said locking lever to retract the latter, said wheel being provided with a driving pawl $p$ and retracting spring $p'$.

It will be remembered that the appropriate signal in the record strip bringing into action either rod 12 effects a reciprocation of the galley trip actuating rod 14 and advantage is taken of this to control the movements of the carrier. To this end driving pawl $p$ is located in such relation to rod 14 that when the latter is advanced in response to its signal, it will advance wheel P' one tooth, and in so doing effect a momentary withdrawal of the locking lever, sufficient to permit the passage of the point of the tooth $c$ and followed by an immediate advance of the locker lever for engagement with the next succeeding tooth. When locking lever O is withdrawn from engagement with the last tooth $c$ of a group, upon its release or return it engages the untoothed section of the periphery of the carrier and the movement imparted by the friction drive continues until the first tooth $c$ of the next succeeding group is brought into engagement with said locking lever, whereupon the motion of the carrier is arrested, with the first channel of the succeeding holder in register with delivery channel G.

The record strip is composed as usual and each completed line of composition is closed by a signal pertaining specially to one of the rods 12. In the casting machine the indicated characters for each line are successively cast and deposited in a line channel in the holder, and upon the presentation of the special signal rod 14 is advanced to shift the carrier, and at the same time the pump lock out is actuated to prevent injection of metal during the cycle in which this feed movement is effected and when no type is called for.

Having thus described the invention, what I claim is:

1. In a type casting machine the combination with a mold, a type receiving channel and a carrier for a type holder situated on a different level from the type channel, of a reciprocating member having two cam slots and a pivoted lever connected with a type pusher and receiving horizontal movement from one of the cams and vertical movement from the other of the cams, substantially as described.

2. In a type casting machine or mechanism furnished with a mold and a plurality of type-delivering pushers, the combination with an intermittently rotatable carrier or table furnished with a series of detachable type holders, of a friction drive for the carrier and mechanism for alternately locking and releasing the carrier, substantially as and for the purpose described.

3. In a type casting machine or mechanism furnished with a type mold and type delivery pushers, the combination with a rotary carrier adapted to receive holders to which the types are delivered by the pushers, of a driving friction clutch for the carrier and a locking device automatically controlled to alternately lock and release the carrier against operation by the clutch, substantially as described.

4. In an automatic type casting machine or mechanism furnished with a mold and type delivery pushers, the combination with a rotatable carrier driven through a clutch and provided with a locking lever normally engaging teeth on the carrier, of a ratchet wheel engaging the locking lever and a member controlled from the record strip of the machine to operate the ratchet, substantially as and for the purpose described.

5. In a type casting and composing machine or mechanism, the combination of a mold, type ejecting pushers, a type transferring pusher, a carrier having holders, a friction clutch for rotating said carrier and a locking device for said carrier controlled by a signal responsive member, substantially as and for the purpose described.

6. In a type casting and composing machine equipped with a mold and type delivering devices, and in combination therewith, the following elements, to-wit: a movable carrier; a plurality of independently removable type receiving holders or galleys disposed in sequence in the direction of movement of the carrier and removably connected to the latter in a manner to successively present their type receiving channels in register with the type delivery; and means for intermittently advancing the carrier to present the galleys or holders successively to said type delivery.

7. In a type casting and composing machine equipped with a mold, type delivering devices and a type receiving channel, and in combination therewith, a movable carrier; a plurality of independent type holders or galleys removably mounted upon and serially arranged in the direction of movement of the carrier, to present their type receiving channels in register with the channel into which the type are received from the mold; and automatic means for advancing the carrier to present successive galleys or holders to said type receiving channels.

8. In a type casting and composing machine equipped with a mold, type delivering means and a type receiving channel, and in combination therewith, the following elements, to-wit: a movable carrier; a plurality of type holders or galleys serially disposed upon said carrier and each containing a plurality of type receiving channels; and automatic means for advancing the carrier to present successive holders and successive channels in the holders at the receiving station.

9. In a type casting and composing machine, provided with a mold and type delivering devices and in combination therewith, a movable carrier, a series of type holders or galleys mounted upon said carrier in a different plane from said type delivering devices, and a transferring member movable in two directions to advance the type from the point at which it is deposited by said type delivering devices to a point opposite the type holder and then by a change in the direction of its movement transport the type into the holder.

10. In a type casting and composing machine the combination of the following elements, to-wit: a mold; type delivering means; a type receiving channel; a movable carrier; a series of type holders or galleys removably applied to the carrier and traversing a path to one side of the type receiving channel; and a translating device movable both longitudinally and laterally of the type receiving channel.

11. In a type casting and composing machine, the combination of the following elements, to-wit: type casting and delivering means including a mold furnished with internal projections for forming oppositely grooved type; a movable carrier; a plurality of galleys or holders serially arranged and detachably applied to the carrier, each holder provided with parallel retaining shoulders to enter the grooves in the type; means for automatically transporting the type from the delivering means to the holder at the time in registry therewith; and means for automatically advancing the carrier to present successive holders.

12. In a type casting and composing machine provided with a mold and type delivering means, and in combination therewith, a movable carrier; a plurality of galleys or holders detachably applied to said carrier and serially disposed in the direction of movement of the carrier; means for transferring the type from said type delivering means to a holder or galley; and automatic means for intermittently advancing the carrier to present successive galleys or holders to said type transferring means the same including a constantly running friction drive and an intermittently acting locking means.

FRANK HINMAN PIERPONT.

Witnesses:
B. WESTACOTT,
O. J. WORTH.